(12) United States Patent
Naude

(10) Patent No.: US 7,344,011 B2
(45) Date of Patent: Mar. 18, 2008

(54) SELF ENERGISING CLUTCH

(75) Inventor: Johannes Jacobus Naude, Randburg (ZA)

(73) Assignee: Varibox (Pty) Limited, Randburg (ZA)

( * ) Notice: Subject to any disclaimer, the term of this patent is extended or adjusted under 35 U.S.C. 154(b) by 268 days.

(21) Appl. No.: 10/561,511

(22) PCT Filed: Aug. 18, 2003

(86) PCT No.: PCT/ZA03/00118

§ 371 (c)(1),
(2), (4) Date: Dec. 20, 2005

(87) PCT Pub. No.: WO2005/017383

PCT Pub. Date: Feb. 24, 2005

(65) Prior Publication Data

US 2007/0108010 A1    May 17, 2007

(51) Int. Cl.
*F16D 13/42* (2006.01)
(52) U.S. Cl. .................................. 192/70.23
(58) Field of Classification Search ............... 192/54.5, 192/54.52, 70.23, 84.91, 85 R, 93 A, 93 C, 192/84.7
See application file for complete search history.

(56) References Cited

U.S. PATENT DOCUMENTS

| | | | |
|---|---|---|---|
| 3,513,954 A | 5/1970 | Popper | |
| 3,869,024 A * | 3/1975 | Hauth et al. | 188/72.5 |
| 4,733,743 A | 3/1988 | Weiss et al. | |
| 6,978,868 B2 * | 12/2005 | Schautt | 188/72.7 |

FOREIGN PATENT DOCUMENTS

| | | |
|---|---|---|
| DE | 664 336 | 8/1938 |
| DE | 101 56 348 | 4/2003 |
| GB | 321 637 | 11/1929 |

* cited by examiner

*Primary Examiner*—Dirk Wright
(74) *Attorney, Agent, or Firm*—Young & Thompson

(57) ABSTRACT

A self energizing clutch includes a shaft (26), a clutch disc (14) on the shaft, engaging elements (30, 32) for disengaging and engaging the disc from and with structure adjacent the disc, and an actuator (34) for moving the engaging elements between its disengaged and engaged positions. The engaging elements include a wedge member (30) one face of which rests on a first face of the disc with its wedging angle diminishing in the direction of rotation of the disc, and a ramp formation which is fixed to the structure and on which a second face of the wedge member, is movable in the direction of rotation of the disc to its engaged position with the engaging force applied by the wedge to the disc, during rotation of the disc, being substantially greater than the locking force created by the actuator with the disc stationary relatively to the structure.

20 Claims, 3 Drawing Sheets

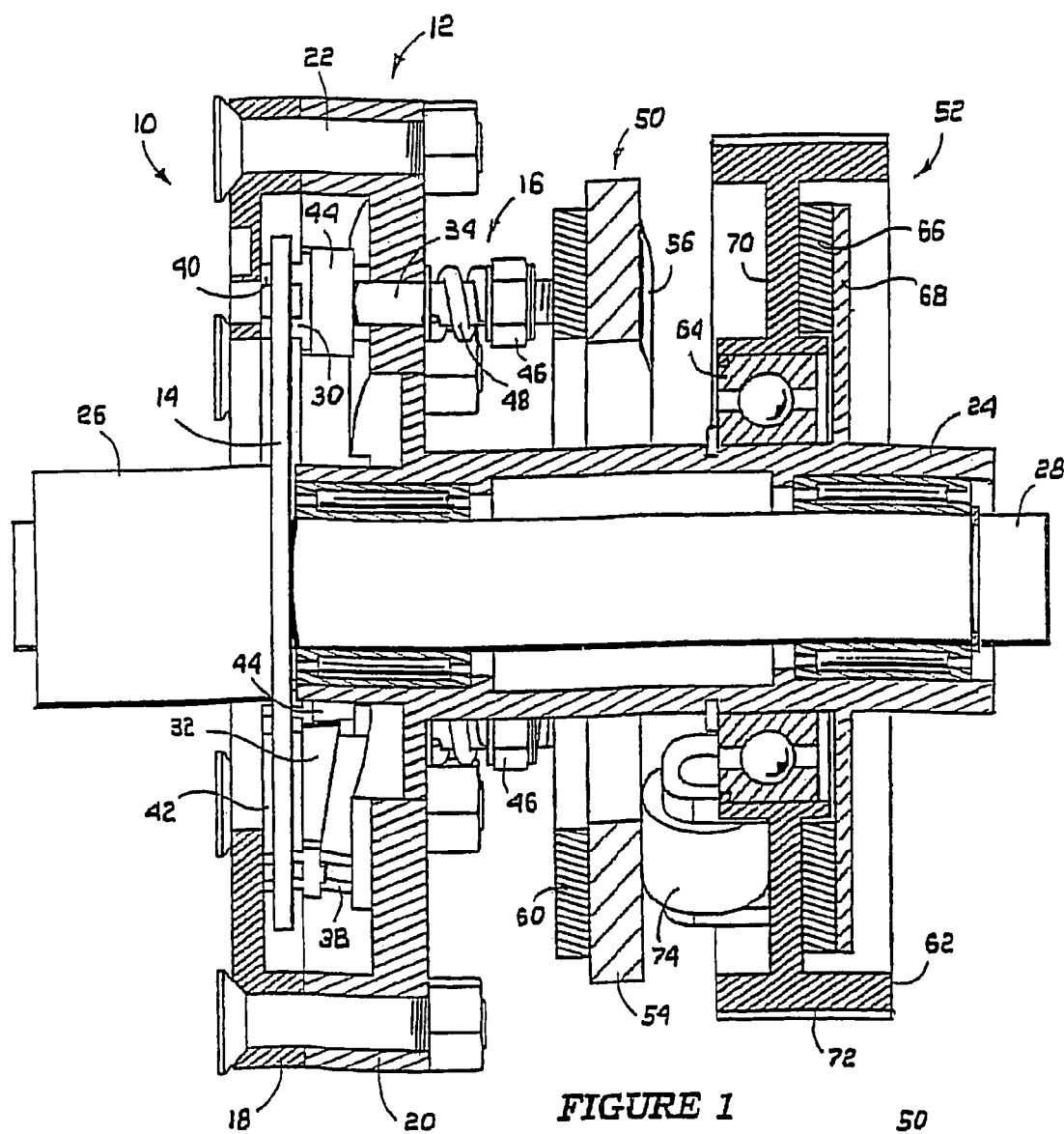
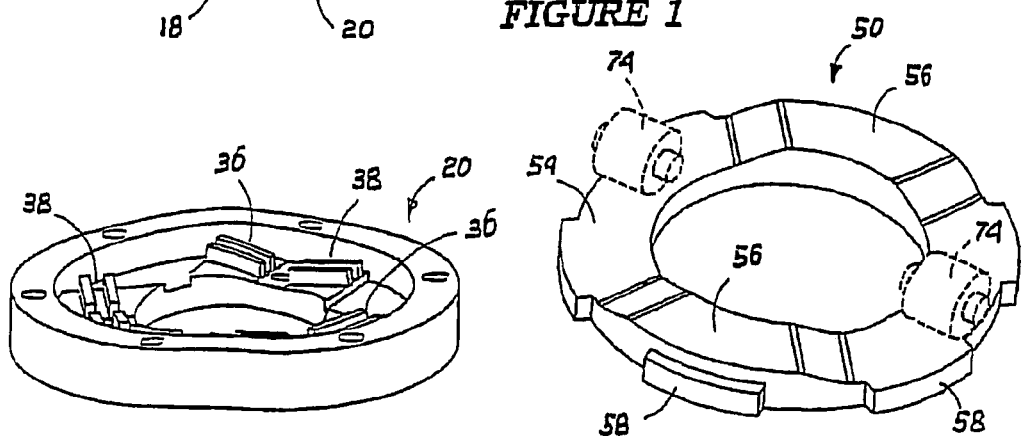
FIGURE 4
FIGURE 5

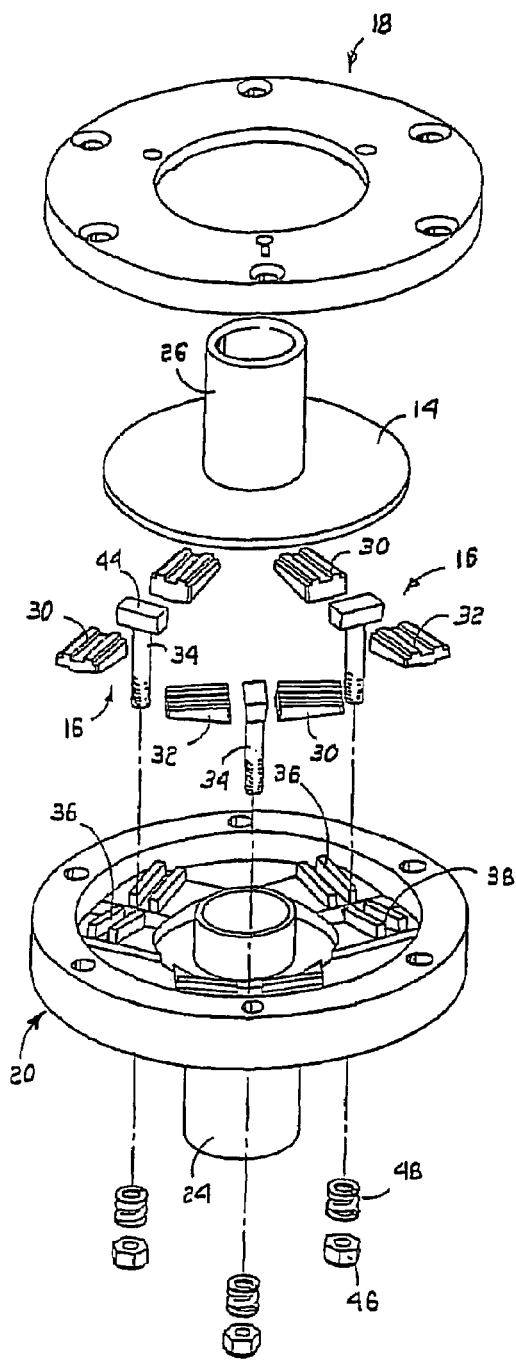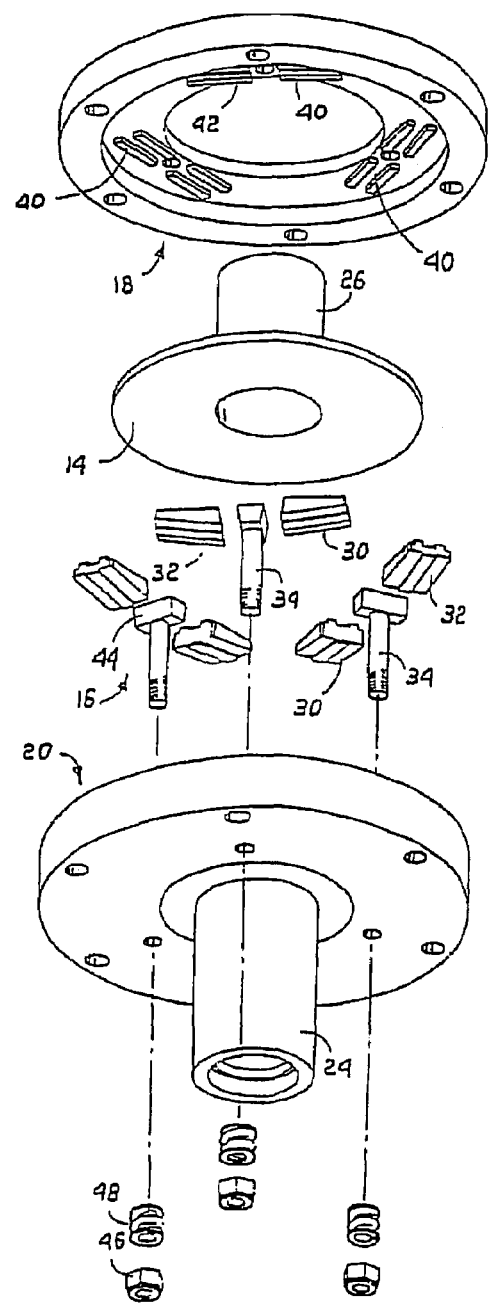
FIGURE 2
FIGURE 3

SELF ENERGISING CLUTCH

FIELD OF THE INVENTION

This invention relates to a self energising clutch for coupling rotatable members or shafts.

BACKGROUND TO THE INVENTION

In the field of intermittent drive continuously variable transmissions (CVT's) overrunning clutches such as sprag clutches or the like are frequently used to combine the outputs of multiple CVT stages which are driven from a common input. The major disadvantage of using any type of one-way clutch in a CVT is the inability of the transmission machines to perform engine braking (the transmission of power in both directions through the CVT). Typical examples of such machines are those described in the specifications of U.S. Pat. No. 6,425,301 and WO 82/02233.

SUMMARY OF THE INVENTION

A self energising friction clutch according to the invention comprises a shaft which is rotatable about its axis, a clutch disc which is concentrically fixed to the shaft, engaging means for disengaging and engaging the disc from and with structure adjacent the disc, an actuator for moving the engaging means between its disengaged and engaged positions of operation, wherein the disc engaging means is a wedging arrangement which includes a wedge member, one face of which rests on a first face of the disc with its wedging angle diminishing in the direction of rotation of the disc, and a ramp formation which is fixed to the structure and on which a second face of the wedge member, opposite its disc face, is movable by the actuator in the direction of rotation of the disc between its rest position on the disc and a second position in which the disc is locked by wedging action to the structure with the locking force applied by the wedge to the disc, during rotation of the disc, being substantially greater than the actuator force required to move the wedge to its locked position with the disc stationary relatively to the structure.

The wedging arrangement may include a reaction formation which is fixed to the structure and which, in the disengaged position of the wedge, rests on the second face of the disc opposite the wedge and, which together with the wedge, lockingly clamps the disc between them in the disc locking position of the wedge. The coefficient of friction of the first face of the wedge member on the disc may be grater than that of its second face on the ramp formation so that the lower frictional resistance to movement of the wedge member on the ramp will amplify the wedging effect of the wedge.

The clutch may be intended for coupling a second rotatable shaft in axial register with and to the disc shaft wherein the structure is a housing in which the disc is rotatable, the second shaft is fixed to and projects from the housing, and the actuator is a pin which is movable in its axial direction through a wall of the housing in a direction normal to the direction of movement of the wedge member and includes on its end in the housing a head having a formation which bears on an inclined end surface of the wedge member and means for moving the pin to cause its head formation to move the wedge member in the direction of rotation of the disc, in use.

The clutch preferably includes at least two wedge arrangements and their actuators which are equally spaced from each other on a path on the disc which is coaxial with its axis of rotation.

The or each disc engaging means may include two wedge arrangements which are arranged in the housing in a back to back relationship with the wedging angles of the wedges facing in opposite directions on a common path of rotation on the disc with the actuator pinhead including two oppositely facing formations which each bear on an inclined end surface of a wedge member of the pair of wedge members so that on activation of the pin by its moving means one of the wedge members of the or each pair of wedge members will be caused to lock the disc in a first direction of rotation and the other in the opposite direction of rotation.

The or each pinhead formation may be a flat surface which is engaged with and complementally angled to the end surface of the wedge on which it bears.

The clutch may, in certain applications, include means for biasing the or each wedge member in a direction opposite the direction of rotation of the disc, in use.

One of the surfaces between the pinhead formation and end surface of the wedge member on which it bears could conveniently be faced with a material having a low coefficient of friction. Additionally one of the interface surfaces between the or each wedge member and its ramp formation may be faced with a material having a low coefficient of friction.

The friction interfaces of the clutch components in the housing may operate in a traction fluid in the housing.

In one form of the invention the actuator pin moving means may be an electro magnet. In another form the actuator pin moving means may be a hydraulic piston and cylinder arrangement.

The clutch may include an activating ring which is centred on the clutch axis with a first face of the ring bearing on the free end of the or each actuator pin on the outside of the clutch housing and which is slidably located and held against rotation in fixed structure adjacent the clutch housing with the pin moving means being adapted to move the ring towards and away from the clutch housing. The or each actuating pin may be spring biased onto the activating ring.

The clutch may be used as an angular velocity extraction device in a constant velocity transmission machine with the second face of the activating ring including at least one outwardly projecting cam formation. The clutch may Include a driver unit which comprises a transmission wheel which is rotatable on the second shaft and at least one formation, which projects from the wheel in its axial direction, which bears against and is cam following on the second face of the activating ring.

The transmission wheel may be a gear wheel which, in use, is gear driven. Alternatively, the transmission wheel may be a pulley which is adapted to be belt driven.

In yet another form of the invention the clutch may be used as a motor vehicle disc brake wherein the shaft to which the clutch disc is fixed is a rotatable wheel shaft of the vehicle, the structure is a U-shaped housing which, in use, is attached to fixed structure adjacent the disc and in which the wedging arrangement is located with the wedge member and the reaction formation serving as the brake pads with the engaging means conveniently being a piston and cylinder arrangement.

BRIEF DESCRIPTION OF THE DRAWINGS

Two embodiments of the invention are now described by way of example only with reference to the drawings in which:

FIG. 1 is a sectioned side elevation of a CVT self energising clutch of the invention and its drive arrangement, FIG. 2 is an exploded isometric view from above and one side of the clutch of FIG. 1, FIG. 3 is an exploded isometric view from below and one side of the clutch components illustrated in FIG. 2, FIG. 4 is an isometric view from above and one side of one component of the clutch housing of FIG. 1, FIG. 5 is an isometric view from above and one side of a cammed plate arrangement for use in the clutch drive arrangement of FIG. 1.

DETAILED DESCRIPTION OF THE ILLUSTRATED EMBODIMENTS

Figure 7:
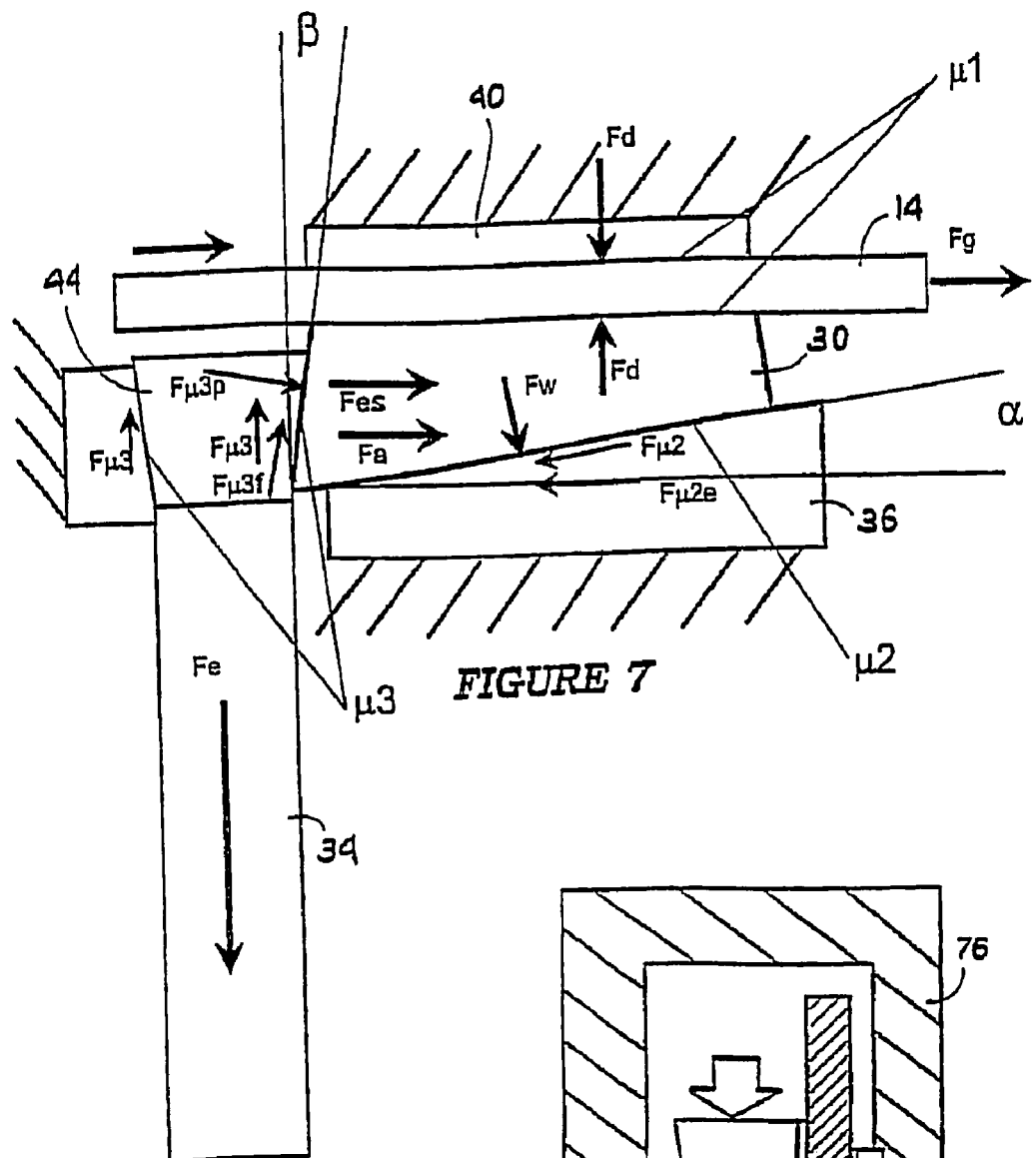
FIG. 7 is a diagram of forces and coefficients of friction between the components of the clutch of the invention from which a mathematical model is derived.

The clutch 10 of the invention is shown in FIGS. 1, 2 and 3 to include a housing 12, a clutch disc 14 and three actuator arrangements 16.

The clutch housing 12 consists of two dished components 18 and 20 which are releasably connected by bolts 22 as shown in FIG. 1.

The housing component 20 is integral with a tubular input shaft 24 and the clutch disc 14 is fixed to a tubular output shaft 26. The two shafts are supported on needle bearings, as shown in. FIG. 1, and are freely rotatable on and concentric with a support shaft 28.

The actuator arrangements 16 are spaced at 120° intervals from each other about the shafts 24 and 26 with each including, as most clearly shown in FIGS. 2, 3 and 4 a pair of oppositely directed wedge members 30 and 32, an actuator pin 34, oppositely directly ramp formations 36 and 38 which are located in the housing component 20 and a pair of disc force reaction members 40 and 42 which are located in and integral with the body component 18. The wedge members 30 and 32, in this embodiment of the invention, are shaped, as shown in FIGS. 1 and 2, to include on their faces which face the clutch disc 14 two spaced and parallel outwardly projecting load bearing formations which, in the assembled clutch, are in register with similar formations on the reaction force members 40 and 42 on the opposite side of the disc 14, as shown in FIG. 1. The wedge member faces, opposite those which carry the outwardly projecting load bearing formations, include a further two load bearing formations which are spaced from each other by an outwardly projecting key which is slidably located between the load bearing formations of the ramp formations 36 and 38.

The actuator pin 34 of each of the actuator arrangements 16 is threaded towards one end and carries on its other end a wedge shaped head 44 which bears on complementally angled end surfaces of the wedge members 30 and 32 as shown diagrammatically in FIG. 7. The inclined wedging surfaces of the actuator head 44 and/or the inclined end surfaces of the wedge members 30 and 32 may be faced with a material such as Teflon which has a low coefficient of friction. Similarly at least one of the surfaces in the interface between the wedge members 30 and 32 and the ramp formations 36 and 38 could be faced with the low friction coefficient material.

The active clutch components are held together by being sandwiched between the housing 12 components 18 and 20 with the upper surfaces (FIGS. 2 and 3) of the wedge members 30 and 32 bearing on the underside of the clutch disc 14. The actuator pins are held in tension between the inclined end surfaces of the wedge members 30 and 32 which bear on the tapered surfaces of the pin head 44 and nuts 46 on the pins 34 by springs 48 on the outside of the housing which act between the outer surface of the housing component 20 and the nuts 46.

It is important that the wedge formations 30 and 32 of the actuator arrangement 16 are located in the clutch housing 12 as close as is possible to alignment with and on a circular concentric path on the clutch disc 14.

The tension of the springs 46 causes the actuator pin heads 44 to hold the wedge members 30 and 32 and the reaction members 40 and 42 in gripping contact with the clutch plate 14 so that the clutch is normally engaged with the shafts 24 and 26 coupled for rotation.

To disengage the clutch plate 14 from the housing 12 and so to permit independent rotation of the shafts 24 and 46, the exposed ends of the actuator pins are simultaneously moved forwardly in the clutch housing to release the head 44 pressure on the wedge members and thus cause incremental movement of the wedge formations 30 and 32 downwardly on the ramp formations 36 and 38 to release their gripping force on the clutch disc 14.

The actuator pins may be actuated by any suitable means such as electro magnets, hydraulic piston and cylinder arrangements and so on. The FIG. 1 cam operated activator and clutch 10 arrangements are, however, particularly suited for extracting sections of angular velocity from an angular velocity profile generator in a CVT machine such as that disclosed in our co-pending patent application Ser. No. PCT/ZA02/00137, publication No. WO 03/056212, the description of which is incorporated herein by reference, in place of the synchronised extraction devices 26 employed in that transmission machine.

The cam operated activation arrangement of FIG. 1 is shown in the drawing to include a cammed ring 50 and a driver unit 52.

The cammed ring 50 is, as shown in FIG. 5, an annular disc 54 which includes two rearwardly facing diametrically opposite cam lobes 56 and peripheral radially extended key formations 58 which are slidably engaged and held against rotation in fixed structure, not shown, which surrounds the ring 50. The forward face of the ring 50 carries a fixed thrust bearing 60 against which the outer ends of the clutch actuator pins 34 are biased by the springs 48.

The number, lengths and positioning of the cam lobes 56 on the ring 50 are dependent on the angular velocity extraction requirements of the assembly in a specific CVT machine in which it is to be used. The cam lobes 56 are exaggerated in FIG. 5 and in practice may have a land height in the region of only 1 mm or less above the rear surface of the ring 50.

The driver unit includes a transmission wheel 62 which is journaled for rotation on the tubular shaft 24 on a bearing 64, and a thrust bearing 66 which is attached to a plate 68 which is fixed to for rotation with the shaft 24 and which rests on the web 70 of the wheel 62, as shown in the drawing. The drive surface 72 of the wheel carries gear teeth or rib formations to enable the wheel to be either gear or flexible belt driven.

The wheel 62 additionally includes two forwardly projecting diametrically opposite pairs of lugs which each carry a roller 74 which bears against the rear face of the cammed ring 50 and its lobes 56 as the wheel 62 is rotated by whatever drives it. Only one of the rollers 74 is shown in FIG. 1 but are both shown diagrammatically in dotted lines in FIG. 5. The pressure with which the rollers 74 bear on the cam ring 50 generate a reaction force against the wheel which is reacted against by the thrust bearing 66.

Figure 6:
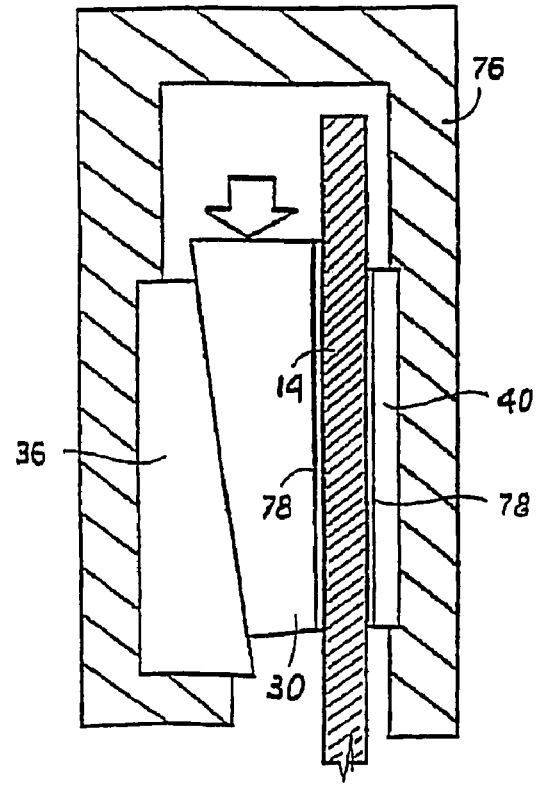
FIG. 6 is a diagrammatic sectioned side elevation of the clutch of the invention in use as a disc brake.

A second embodiment of the clutch of the invention is diagrammatically illustrated in FIG. 6 in which it is employed as a motor vehicle wheel disc brake or the like. The reference numbers to the clutch components in FIG. 6 are the same as those used on identical components in the previous embodiment. The clutch brake components are shown located in a U-shaped housing 76 which is attached to fixed structure to be located over a portion of the brake disc 14 circumference.

The hydraulic actuator (piston) of a conventional disc brake actuator is replaced by a significantly smaller piston and cylinder arrangement which serves the same function as the actuator pin 38 in the previous embodiment in moving the one brake pad (wedge 30 with brake pad braking material 78 on the side facing clutch 14 and steel on the other) in the direction of the arrow in the drawing. The remaining brake pad (reaction member 40) on the opposite side of the brake disc 14 serves the same function as in any conventional brake disc calliper arrangement. As the coefficient of friction between the brake pad and the brake disc 14 (brake pad braking material 78 on the disc contact surface of both brake pads) is larger than the coefficient of friction between the ramp 36 and the brake pad 30, typically steel on steel, the brake pad 30 will become self energising as well as benefit from the difference in coefficients of friction as is mathematically demonstrated below. Since a smaller hydraulic piston is used, in place of the conventional larger piston and cylinder arrangement, a significantly smaller than conventional force is required to brake the disc 14. This application of the clutch of the invention additionally simplifies the implementation of braking and traction control strategies currently widely employed by motor vehicle manufacturers. The operation and effectiveness of the self-energising clutch of the invention will now in more detail be explained below by way of a mathematical model.

FIG. 7 diagrammatically illustrates the forces and angles involved between the wedge member 30, the actuating pin 34, clutch disc 14, inclined ramp formations 32 and a disc . . . reaction member 40.

The symbols used in the mathematical model are:

| | |
|---|---|
| Fes | Self energising force |
| Fe | Actuating pin force |
| Fa | Actuating force |
| Fd | Force perpendicular to the disc |
| Fg | Gripping force on the disc |
| Fµ3 | Friction force component in the opposite direction to Fe |
| Fµ3f | Friction force between contacting surfaces between the actuator pinhead 44 and the end surfaces of the wedge members 30 and 32 |
| Fµ3p | Normal force on contacting surfaces between the actuator pinhead 44 and the end surfaces of the wedge members 30 and 32 |
| Fw | Normal force on the wedge 30 and ramp 32 contacting surfaces |
| Fµ2 | Friction force between contacting wedge and ramp surfaces |
| Fµ2e | Friction force component of Fµ2 in the direction opposite to Fg |
| r | Average contact radius of wedge 30 and reaction member 40 on disc 14 |
| Tg | Torque on disc as a result of Fg |

Actuating pin 34 is tensioned in the indicated direction by a force Fe by a spring 48. The angle β is the angle between the axis of the actuating pin 34 and the mating surfaces of the actuating pinhead 44 and the wedge formation 30 respectively. The coefficient of friction at this interface is µ3.

The reaction force Fa, in a direction parallel to the output disc 14, is calculated as follows:

$$Fa = \frac{Fe}{\tan(\beta)} - 2 \cdot F\mu 3 \cdot \mu 3 \quad (A)$$

where Fµ3 is the friction force component in the opposite direction to Fe and is calculated as:

$$F\mu 3 = F\mu 3f \cos(\beta) \quad (B)$$

where Fµ3f is the friction force due to µ3 and is calculated as:

$$F\mu 3f = F\mu 3p \cdot \mu 3 \quad (C)$$

where Fµ3p is the normal force on the µ3 friction interface and is calculated as:

$$F\mu 3p = Fa \cdot \cos(\mu) \quad (D)$$

Combining equation A to D results in $$Fa = \frac{Fe}{\tan(\beta)(1 + 2\cos(\beta)^2 \, \mu 3^2)} \quad (E)$$

As a result of the direction of rotation of the disc 14 and the friction µ1 between the output disc 14 and the wedge formation 30 a force Fes will tend to force the wedge formation in the direction of rotation of the disc 14 and thus increasing the gripping force Fd on disc due to the wedging action of the wedge member 30. Thus with α being the angle of inclination of the wedge 30, the gripping force Fd on the output disc is calculated as:

$$\frac{Fe + Fa}{Fd} = \tan(\alpha) \quad (F)$$

Where Fe is calculated as:

$$Fe = sg \cdot (\mu 1 \cdot Fd - F2\mu e) \quad (G)$$

where sg is 1 or −1 in dependence on the direction of rotation of output disc 14. For the disc direction illustrated in FIG. 7 sg=1, Fµ2e is the friction component parallel to disc 14 caused by the force Fw due to the coefficient of friction µ2 between the wedge 30 and the inclined ramp 36 surface and is calculated as:

The friction component along wedge/ramp interface is calculated as:

$$F\mu 2e = F\mu 2 \cdot \cos(\alpha) \quad (H)$$

The friction force along the wedge/ramp interface is calculated as:

$$F\mu 2 = Fw \cdot \mu 2 \quad (I)$$

The normal force on above friction interface Fw is calculated as:

$$\frac{Fd}{Fw} = \cos(\alpha) \quad (J)$$

The total gripping force Fg on the clutch disc 14 is generated by force Fd on both sides of the disc 14 with the coefficient of friction being µ1 and is thus calculated as:

$$Fg = 2 \cdot Fd \cdot \mu1 \quad (K)$$

Combining equations E to K to solve for Fg in terms of the coefficients of friction and Fe results in:

$$Fg = 2\mu1 \frac{Fe}{\tan(\beta)\left(\begin{array}{c}\tan(\alpha) + \\ 2*\tan(\alpha)\cos(\beta)^2\mu3^2 sg\mu12sg\mu1\cos(\beta)^2\mu3^2 + \\ sg\mu2 + 2sg\mu2\cos(\beta)^2\mu3^2\end{array}\right)} \quad (L)$$

Noticing that very small values for µ3 will be used in practice, typically smaller than 0.1, thus equation L may be simplified to:

$$Fg = 2\mu1 \frac{Fe}{\tan(\beta) \cdot (\tan(\alpha) - sg\mu1 + sg \cdot \mu2)} \quad (M)$$

From the above two equations it can be seen that by making µ3 as small as possible Fg will be optimised. Typically thus the abutting surfaces of the wedge 30 and the actuator pinhead 44 may be large enough to create a pressure small enough that is able to accommodate a Teflon friction interface (Teflon facing on one surface) which will result in a coefficient of friction of µ3=0.02. The same applies for the friction interface µ2. These two friction interfaces may include needle, roller or ball bearings to further reduce the coefficient of friction.

However, µ1 needs to be maximised in order to maximise Fg. In this case the use of so-called traction fluid may be beneficial. Traction fluid is a lubricant that changes its coefficient of friction to about 0.1 under very high pressure, typically between 1000 MPa to 3000 MPa while still providing a lubricant film. Thus the contact surfaces gripping the clutch disc 14 may be small enough to, as a result of the engaging force of spring 48 creating the gripping force Fd, create pressures between 1000 MPa and 3000 MPa in order to obtain a transformation to a higher coefficient of friction of about µ1=0.1.

The same traction fluid may be employed throughout the entire self-energising clutch of the invention but will maintain lower coefficients of friction at µ2 and µ3 due to lower pressures at the friction interfaces resulting from larger surface areas. As a demonstration of the effectiveness of the self-energising clutch of the invention the following values are used in equation L which will result in a positive employment of the self-energising force Fes:

Fe=1000 N=100 kg

α=β=9° sg=1

Above entered in equation L results in:

Fg=15125 N

Considering the other wedge formation 32 of the first embodiment pair where sg=1 and where the energising force Fes is operating negatively results in:

Fg=5404 N if a clutch disc 14 is considered where a gripping force Fg is applied to it at an average disc radius of r=50 mm this will result in a gripping torque Tg of:

$$Tg = Fg \cdot r = (15125 + 5404) \cdot 0.05 = 1026 \text{ N.m} \quad (N)$$

Note that the term:

$$\tan(\alpha) + 2*\tan(\alpha)\cdot\cos(\beta)^2\cdot\mu3^2 - sg\cdot\mu1 - 2\cdot sg\cdot\mu1\cdot\cos(\beta)^2\cdot\mu3^2 + sg\cdot\mu2 + 2\cdot sg\cdot\mu2\cdot\cos(\beta)^2\cdot\mu3^2$$

in equation L or simplified term:

$$(\tan(\alpha) - sg\cdot\mu1 + sg\cdot\mu2)$$

in equation M for sg=1 should importantly always be positive. A negative or zero value will produce self-locking and the wedge will thus not disengage when the actuating pin 34 force Fe is removed.

This invention is not limited to above traction fluid but may include any suitable conventional lubricant or no lubricant at all.

This invention is further not limited to the clutch being normally engaged and the angle β on the actuating pinhead 44 may be angled in the opposite direction to make the self energising clutch of the invention operate as normally disengaged.

The invention is further not limited to the friction surfaces illustrated in FIGS. 2 and 3 and these may be any patterned or curved contact surface developed to optimise the coefficients of friction.

This invention is further not limited to a fully engage clutch but may be used as a slip clutch.

Yet further, springs may be included to fully disengage the wedge members 30 and 32 to reduce the lubricant drag in the self-energising clutch of the invention to reduce losses when freewheeling.

The self-energising clutch of the invention may be used as a one-way clutch by only employing one of the wedge members 30 or 32 in each pair as is the case in FIGS. 6 and 7. In such an arrangement α can be reduced to the point of self-locking. On reverse rotation of disc 14, disengagement would occur automatically.

Alternatively, α and β may be reduced to the point just prior to self-locking so that a very small spring 48 force (Fe) would result in a large Fg. In this case upon reversed rotation of the disc 14 Fe would be of an insignificant nature in resulting in Fg and would thus result in less resistance while disc 14 is freewheeling in the opposite direction.

The contact surfaces may be optimised for area to produce higher or lesser stresses to optimise the use of traction fluid.

As mentioned above, the clutch of the FIG. 1 embodiment of this invention is eminently suited for use in CVT's because of its instantaneous engage and disengage capability, low actuating force requirements and its low maintenance compact design.

The invention claimed is:

1. A self energising friction clutch comprising;
   a shaft which is rotatable about its axis,
   a clutch disc which is concentrically fixed to the shaft,
   engaging means for disengaging and engaging the disc from and with structure adjacent the disc, including a wedging arrangement which includes a wedge member having a wedge angle [ ], a first face of which rests on a first face of the disc with the second face of the wedge member, opposite its first face, tapering towards the first face of the member in the direction of rotation of the disc and from a first end of the wedge member towards the smaller second end of the wedge member, an actuator for moving the engaging means between its disengaged and engaged positions of operation, including a pin which passes through the structure in a direction normal to the disc face and carries a head which has a formation which projects beyond the side of the pin to bear on the first end of the wedge member, and a ramp formation, which is fixed to the structure and on which the second face of the wedge member is movable by the actuator in the direction of rotation of the disc between its rest position on the disc and a second position to which the disc is progressively locked by wedging action to the structure with the locking force applied by the wedge member to the disc, during rotation of the disc, being substantially greater than the actuator force required to move the wedge to its locked position with the disc stationary relatively to the structure.

2. A clutch as claimed in claim 1 wherein the wedging arrangement includes a reaction formation which is fixed to the structure and which, in the disengaged position of the wedge, rests on the second face of the disc opposite the wedge and, which together with the wedge, lockingly clamps the disc between them in the disc locking position of the wedge.

3. A clutch as claimed in claim 2 wherein the coefficient of friction of the first face of the wedge member on the disc is greater than that of its second face on the ramp formation so that the lower frictional resistance to movement of the wedge member on the ramp will amplify the wedging effect of the wedge.

4. A clutch as claimed in claim 3 for coupling a second rotatable shaft in axial register with and to the disc shaft wherein the structure is a housing wherein the disc is rotatable, the second shaft is fixed to and projects from the housing, and the actuator pin is movable in its axial direction through a wall of the housing in a direction normal to the disc face with the pin head projecting formation in the housing bearing on the first end of the wedge member and means for moving the pin to cause its head projecting formation to move the wedge member in the direction of rotation of the disc, in use.

5. A clutch as claimed in claim 4 including at least two wedging arrangements and their actuator pins which are equally spaced from each other on a path on the disc which is coaxial with its axis of rotation.

6. A clutch as claimed in claim 5 wherein the or each disc engaging means includes two wedge arrangements which are arranged in the housing in a back to back relationship with the wedging angles [ ] of the wedges facing in opposite directions on a common path of rotation on the disc with the actuator pin head including two oppositely facing projecting formations which each bear on a first end surface of a wedge member of the pair of wedge members so that on activation of the pin by its moving means one of the wedge members of the or each pair of wedge members will be caused to lock the wedge member to the disc in a first direction of rotation and the other in the opposite direction of rotation.

7. A clutch as claimed in claim 6 wherein the first end of the or each wedge is a flat surface which is inclined at an angel [ ] to a line normal to the first face of the disc and the or each pin head projecting formation is a flat surface which is engaged with and complementally angled to the flat end surface of the wedge on which it bears.

8. A clutch as claimed in claim 1 including means for biasing the or each wedge member in a direction opposite the direction of rotation of the disc, in use.

9. A clutch as claimed in claim 7 wherein one of the surfaces between the pin head formation and end surface of the wedge member on which it bears is faced with a material having a low coefficient of friction.

10. A clutch as claimed in claim 9 wherein one of the interface surfaces between the or each wedge member and its ramp formation is faced with a material having a low coefficient of friction.

11. A clutch as claimed in claim 9 wherein roller bearings are rotatably located between the interface surfaces between the or each wedge member and its ramp formation.

12. A clutch as claimed in claim 7 wherein the friction interfaces of the clutch components in the housing operate in a traction fluid in the housing.

13. A clutch as claimed in claim 4 wherein the actuator pin moving means is an electro magnet.

14. A clutch as claimed in claim 4 wherein the actuator pin moving means is a hydraulic piston and cylinder arrangement.

15. A clutch as claimed in claim 4 wherein the actuator pin moving means includes an activating ring which is centred on the clutch shaft axis with a first face of the ring bearing on the free end of the or each actuator pin on the outside of the clutch housing and which is slidably located and held against rotation in fixed structure adjacent the clutch housing with the pin moving means being adapted to move the ring towards and away from the clutch housing.

16. A clutch as claimed in claim 5 wherein the or each actuating pin is spring biased onto the activating ring.

17. A clutch as claimed in claim 16 which is used as an angular velocity extraction device in a constant velocity transmission machine with the second face of the activating ring including at least one outwardly projecting cam formation.

18. A clutch as claimed in claim 17 including a driver unit which comprises a transmission wheel which is rotatable on the second shaft and at least one formation, which projects from the wheel in its axial direction, which bears against and is cam following on the second face of the activating ring.

19. A clutch as claimed in claim 18 wherein the transmission wheel is a gear wheel which, in use, is gear driven.

20. A clutch as claimed in claim 18 wherein the transmission wheel is a pulley which is adapted to be belt driven.

* * * * *